(12) United States Patent
Wilson

(10) Patent No.: US 12,005,842 B2
(45) Date of Patent: Jun. 11, 2024

(54) CARGO SUPPORT ASSEMBLY

(71) Applicant: Harvey Wilson, Gadsden, AL (US)

(72) Inventor: Harvey Wilson, Gadsden, AL (US)

(*) Notice: Subject to any disclaimer, the term of this patent is extended or adjusted under 35 U.S.C. 154(b) by 51 days.

(21) Appl. No.: 17/983,485

(22) Filed: Nov. 9, 2022

(65) Prior Publication Data

US 2024/0149799 A1    May 9, 2024

(51) Int. Cl.
*B60R 11/06*      (2006.01)
*B60R 9/06*      (2006.01)
*B60R 11/00*      (2006.01)

(52) U.S. Cl.
CPC .............. *B60R 11/06* (2013.01); *B60R 9/065* (2013.01); *B60R 2011/004* (2013.01)

(58) Field of Classification Search
CPC .................................. B60R 9/065; B60R 11/06
USPC .......................................... 224/404; 296/37.6
See application file for complete search history.

(56) References Cited

U.S. PATENT DOCUMENTS

| | | |
|---|---|---|
| 4,266,821 A | 5/1981 | Gillet |
| 4,564,167 A | 1/1986 | Smith |
| D343,601 S | 1/1994 | Brady |
| 6,588,720 B1 | 7/2003 | Revette |
| 7,073,867 B2 * | 7/2006 | Huenke ...................... B60P 1/06 298/1 A |
| 7,111,884 B2 * | 9/2006 | Johnson .................. B60R 11/06 296/26.1 |
| 9,120,427 B1 | 9/2015 | Wolski |
| 10,227,047 B2 | 3/2019 | Purvis |
| 2003/0189353 A1 * | 10/2003 | Moore ..................... B60R 11/06 296/37.6 |
| 2007/0152002 A1 | 7/2007 | Dollar, Jr. |
| 2007/0152003 A1 | 7/2007 | Dollar, Jr. |
| 2014/0054339 A1 * | 2/2014 | Smith ....................... B60P 3/14 224/404 |
| 2015/0086312 A1 * | 3/2015 | Ohnesorge .............. B60R 11/06 414/462 |

* cited by examiner

*Primary Examiner* — Justin M Larson

(57) ABSTRACT

A cargo support assembly includes a pair of cross members that each extends laterally across a tailgate of a truck bed. A pair of brackets is each attached to the pair of cross members and a pair of mounts is each removably attachable to a respective bracket. Each of the mounts has a receiving element and a pair of support tubes is each insertable into the receiving element in a respective one of the mounts. A pair of box pivots is each movably attachable to a respective one of the support tubes. A box is provided and each of the box pivots is attachable to the box such that the box is pivotally retained between the pair of support tubes. In this way the box is retained in an upright position whether the tailgate on the truck bed is positioned in a closed position or an open position.

13 Claims, 6 Drawing Sheets

CARGO SUPPORT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to cargo devices and more particularly pertains to a new cargo device for pivotally attaching a box to a tailgate of a truck bed. The device includes a pair of.

(2) Description of Related Art Including Information Disclosed Under 37 CFR 1.97 and 1.98

The prior art relates to cargo devices.

BRIEF SUMMARY OF THE INVENTION

An embodiment of the disclosure meets the needs presented above by generally comprising a pair of cross members that each extends laterally across a tailgate of a truck bed. A pair of brackets is each attached to the pair of cross members and a pair of mounts is each removably attachable to a respective bracket. Each of the mounts has a receiving element and a pair of support tubes that is each insertable into the receiving element in a respective one of the mounts. A pair of box pivots is each movably attachable to a respective one of the support tubes. A box is provided and each of the box pivots is attachable to the box such that the box is pivotally retained between the pair of support tubes. In this way the box is retained in an upright position whether the tailgate on the truck bed is positioned in a closed position or an open position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
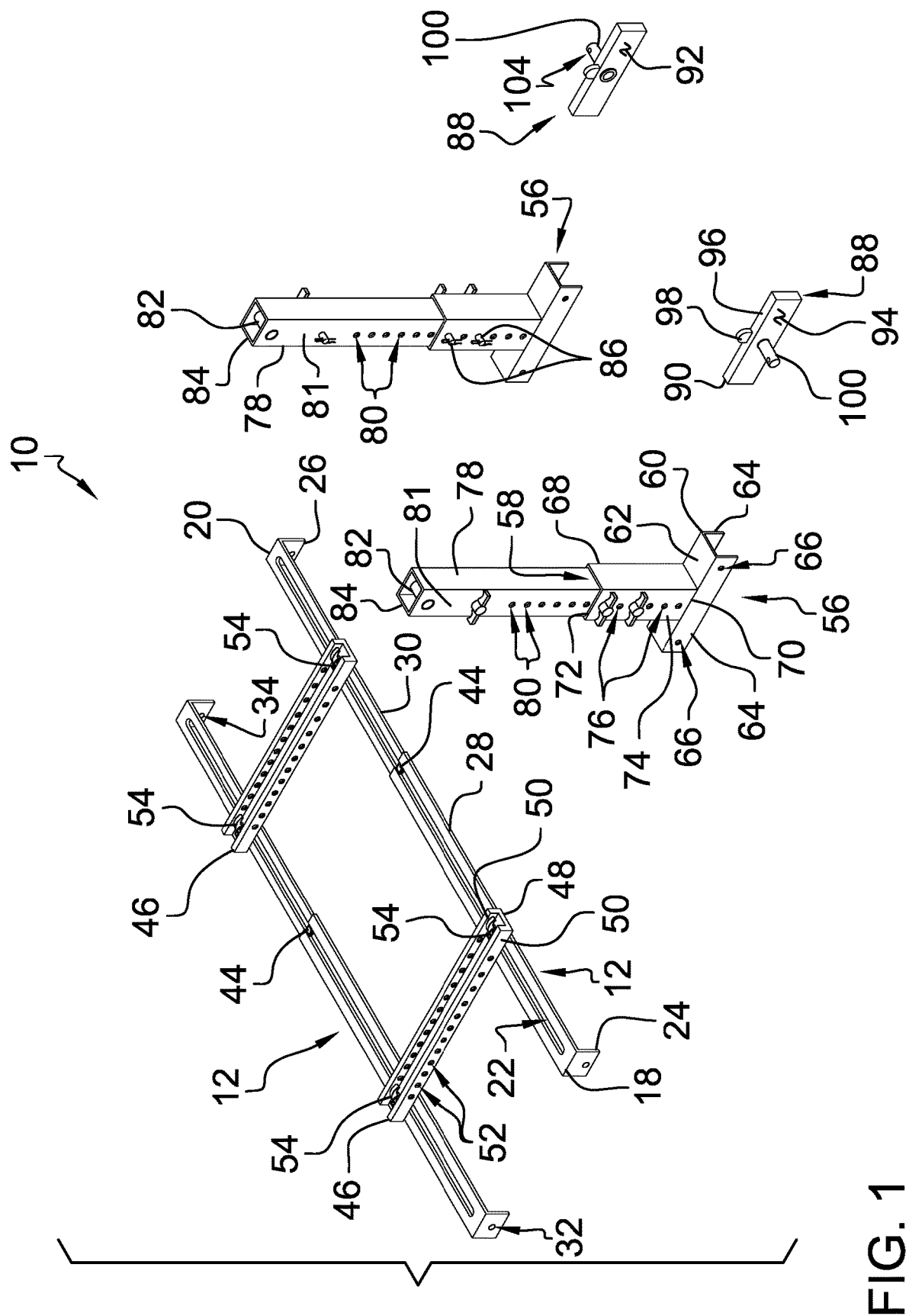
FIG. 1 is a perspective view of a cargo support assembly according to an embodiment of the disclosure.
Figure 2:
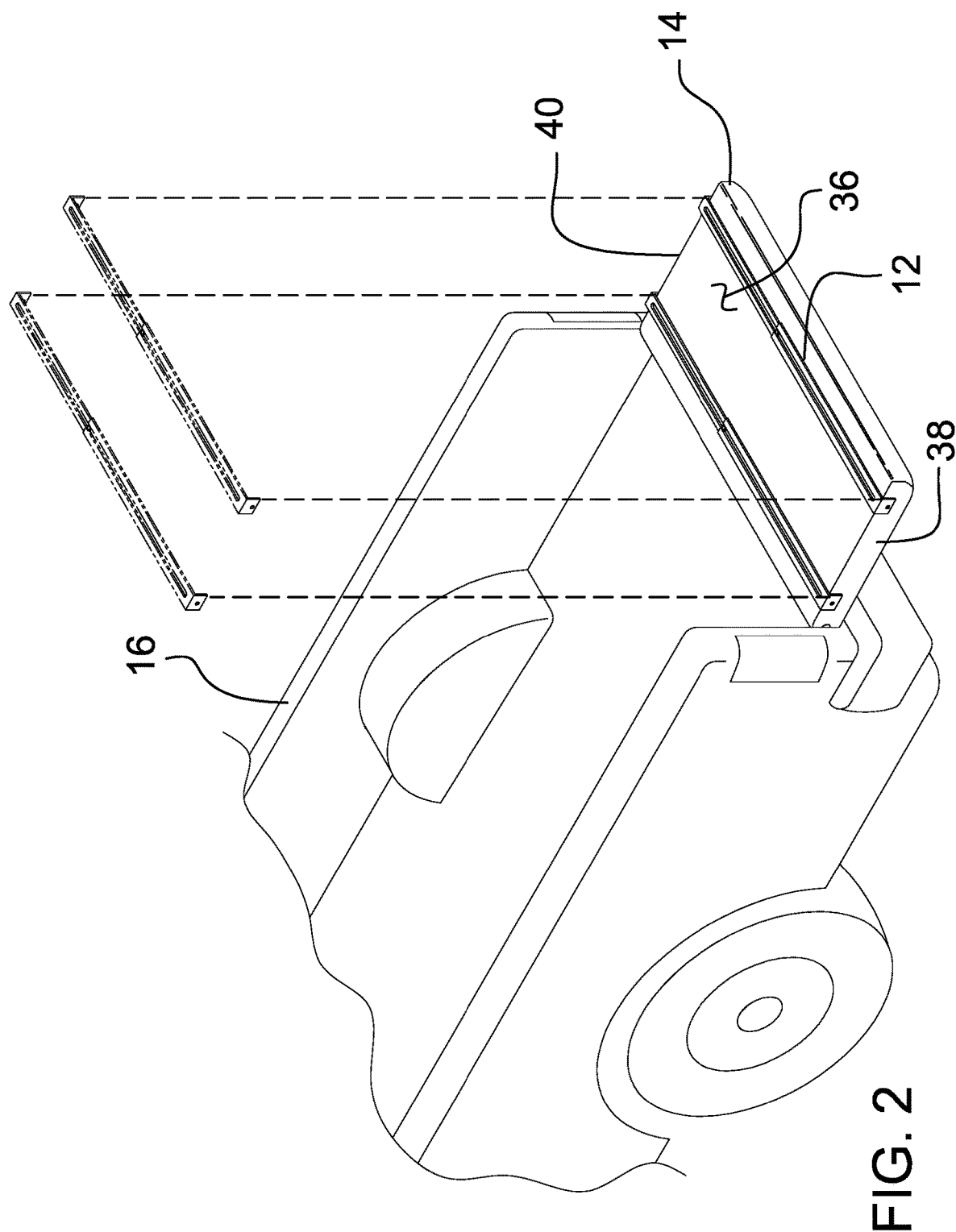
FIG. 2 is an exploded perspective view of a pair of cross members of an embodiment of the disclosure.
Figure 3:
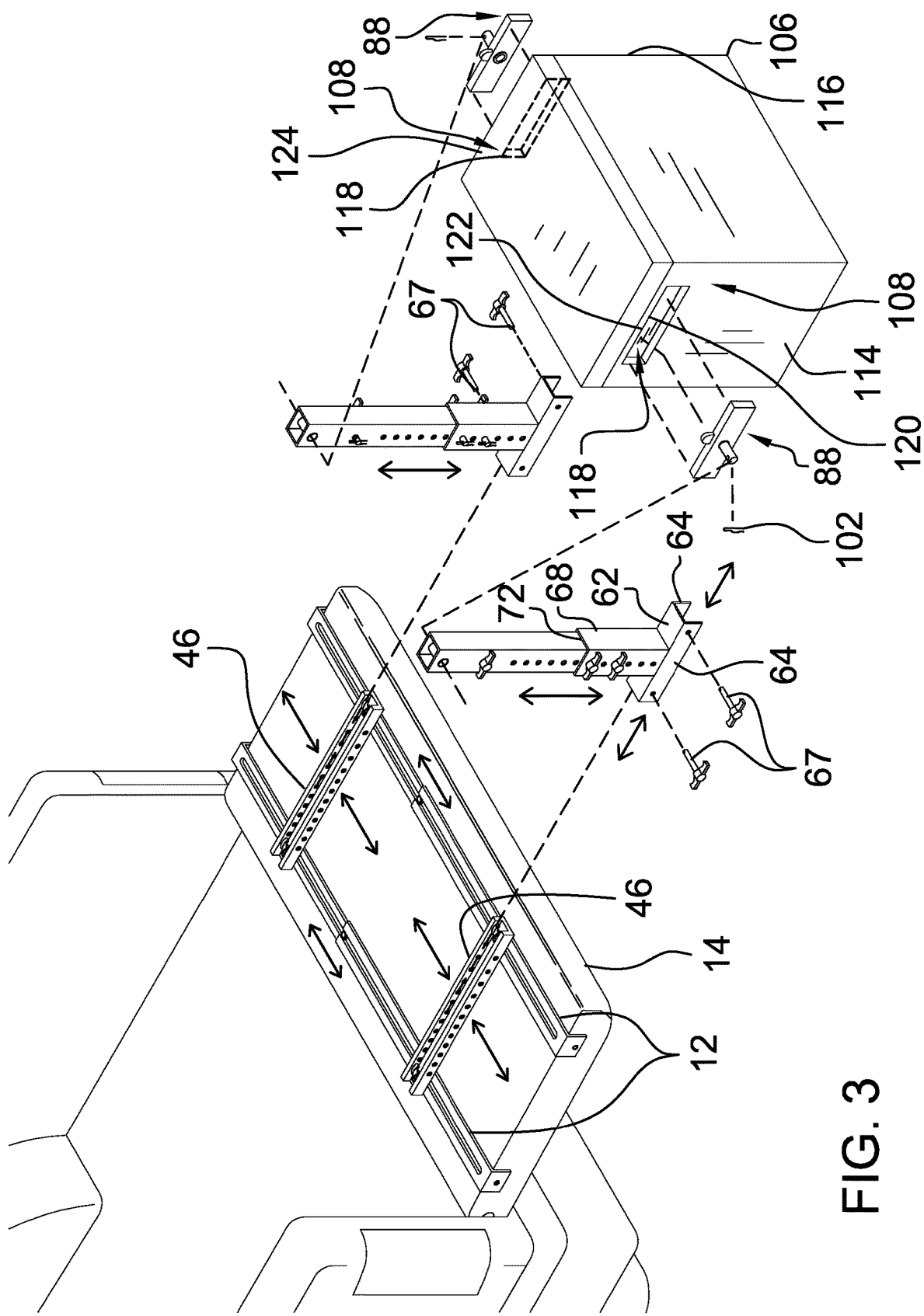
FIG. 3 is an exploded view of an embodiment of the disclosure.
Figure 4:
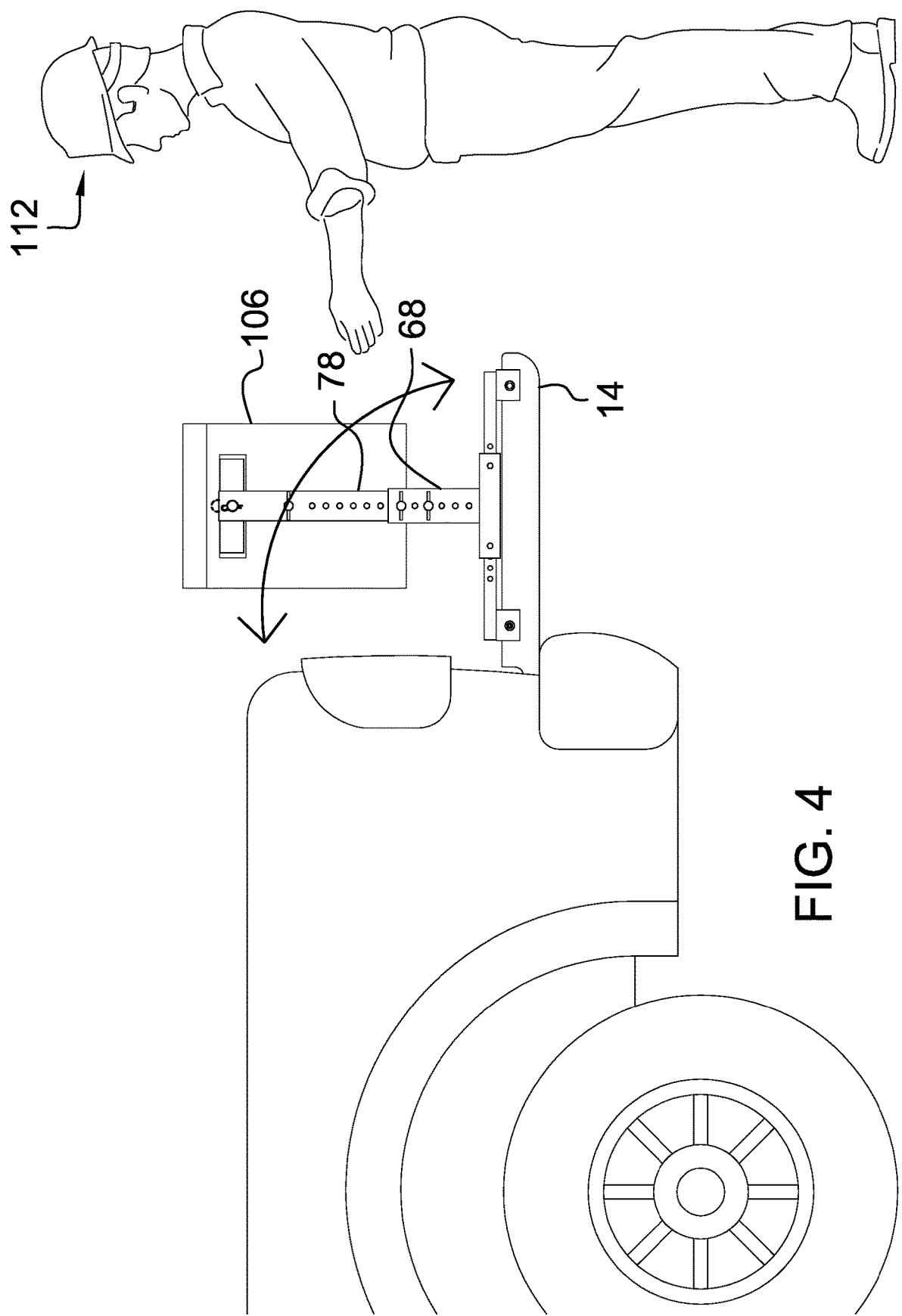
FIG. 4 is a perspective in-use view of an embodiment of the disclosure showing a tailgate in an open position.
Figure 5:
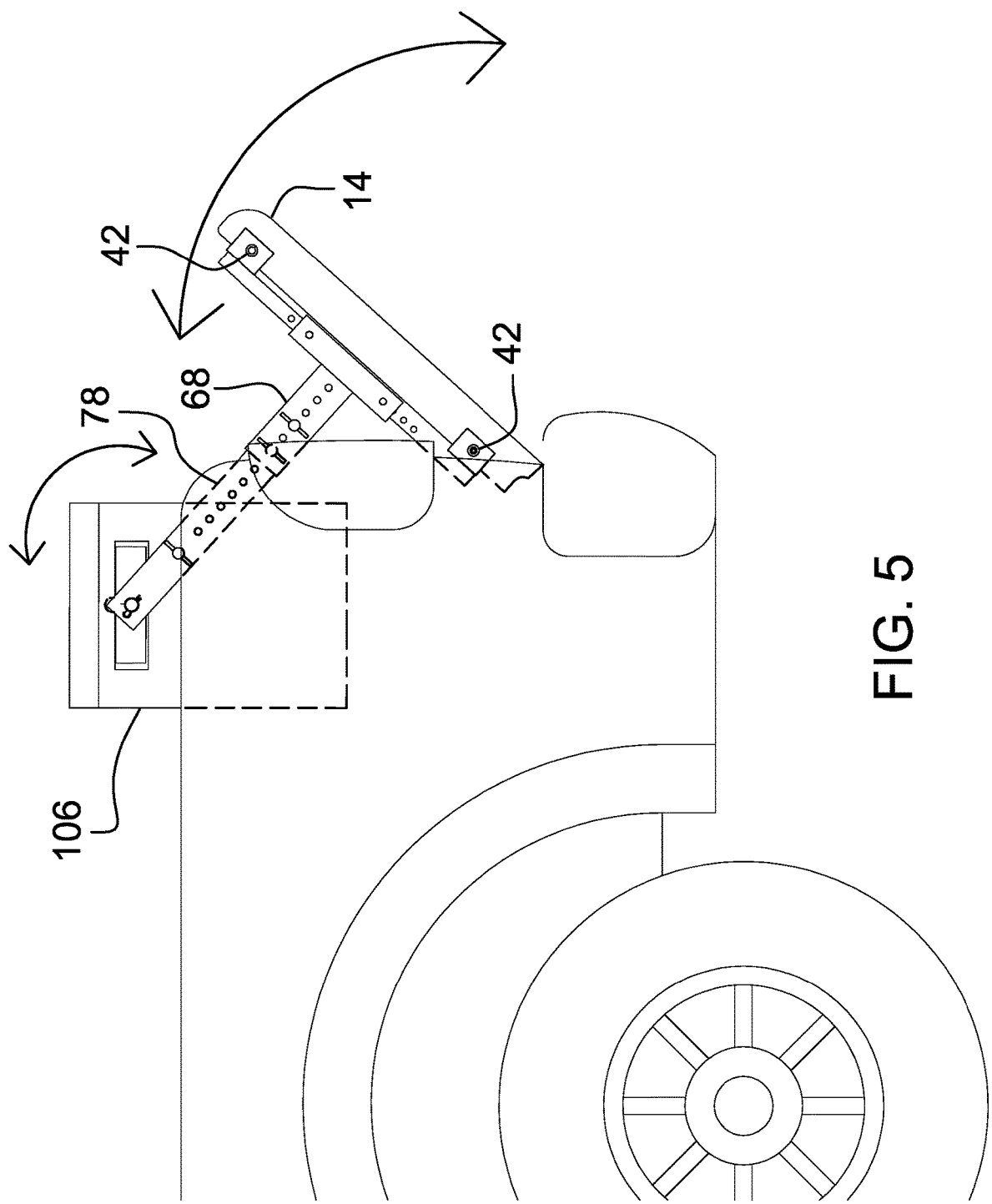
FIG. 5 is a perspective in-use view of an embodiment of the disclosure showing a tailgate in transition between an open position and a closed position.
Figure 6:
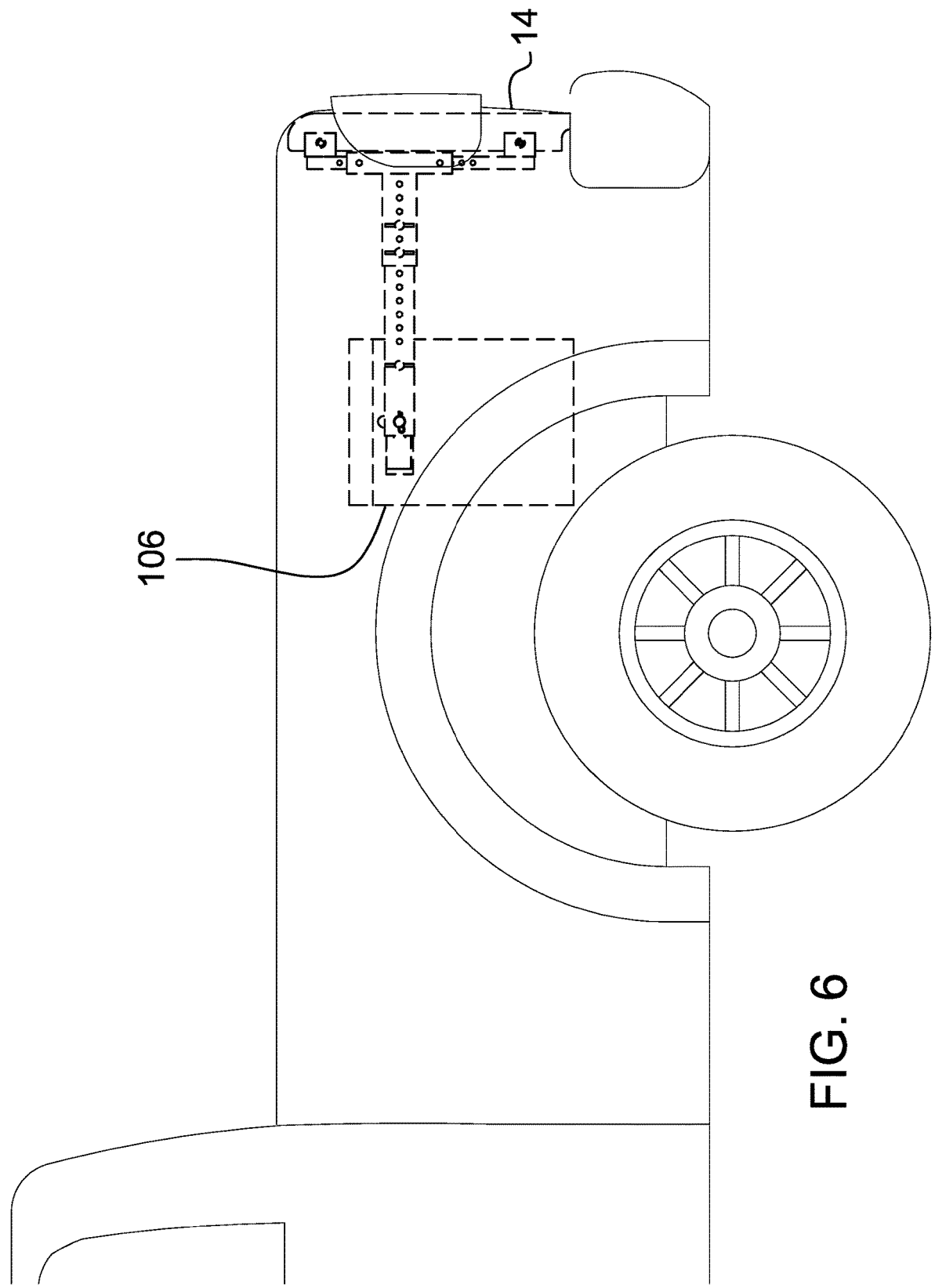
FIG. 6 is a perspective in-use view of an embodiment of the disclosure showing a tailgate in a closed position.

With reference now to the drawings, and in particular to FIGS. 1 through 6 thereof, a new cargo device embodying the principles and concepts of an embodiment of the disclosure and generally designated by the reference numeral 10 will be described.

As best illustrated in FIGS. 1 through 6, the cargo support assembly 10 generally comprises a pair of cross members 12 and each of the cross members 12 has a telescopically adjustable length thereby facilitating each of the cross members 12 to extend laterally across a tailgate 14 of a truck bed 16. The truck bed 16 may be a bed on a pickup truck or other type of motorized cargo vehicle. Each of the cross members 12 has a first end 18, a second end 20 and a slot 22 extending substantially between the first end 18 and the second end 20. Each of the cross members 12 has a first foot 24 that is perpendicularly oriented with the first end 18 and each of the cross members 12 has a second foot 26 that is perpendicularly oriented with the second end 20. Each of the cross members 12 comprises a first half 28 that slidably engages a second half 30 thereby facilitating the cross members 12 to have the telescopically adjustable length. Furthermore, the first end 18 is associated with the first half 28 and the second end 20 is associated with the second half 30.

The first foot 24 associated with each of the cross members 12 has a first aperture 32 extending through the first foot 24. The second foot 26 associated with each of the cross members 12 has a second aperture 34 extending through the second foot 26. Each of the cross members 12 lies on a top surface 36 of the tailgate 14 having each of the first foot 24 and the second foot 26 being abutted against a respective one of a first lateral edge 38 and a second lateral edge 40 of the tailgate 14. In this way a plurality of fasteners 42, such as screws or bolts, can be extended through a respective one of the first aperture 32 and the second aperture 34 associated with a respective one of the cross members 12 and engage a respective one of the first lateral edge 38 and the second lateral 40 edge of the tailgate 14. Thus, the cross members 12 are attached to the tailgate 14.

A pair of locks 44 is provided and each of the locks 44 is movably integrated into a respective one of the cross members 12. Each of the locks 44 extends through the slot 22 in the first half 28 and the slot 22 in the second half 30 of the respective cross member 12. Each of the locks 44 is tightenable to compress the first half 28 of the respective cross member 12 against the second half 30 of the respective cross member 12 for retaining the respective cross member 12 at a desired length. Each of the locks 44 might comprise a spring loaded pin, a nut and a bolt or any other mechanism that can engage the first half 28 and the second half 30.

A pair of brackets 46 is provided and each of the brackets 46 is attached to the pair of cross members 12 such that each of the brackets 46 is perpendicularly oriented with the pair of cross members 12. Each of the brackets 46 comprises a lower panel 48 which extends between a pair of outward panels 50 and each of the outward panels 50 is perpendicularly oriented with the lower panel 48. The lower panel 48 of each of the brackets 46 rests on the pair of cross members 12 having the outward panels 50 of each of the brackets 46 extending away from the cross members 12. Each of the outward panels 50 of each of the cross members 12 has a plurality of holes 52 and each of the plurality of holes 52 are spaced apart from each other and are distributed along a respective one of the outward panels 50.

A plurality of bracket fasteners 54 is provided and each of the plurality of bracket fasteners 54 extends through the lower panel 48 of a respective one of the brackets 46 and extends through the slot 22 in a respective one of the first half 28 and the second half 30 of a respective one of the cross members 12 for fastening the brackets 46 to the cross members 12. Each of the bracket fasteners 54 may comprise a nut and bolt or other type of releasable, mechanical fastener.

A pair of mounts 56 is each removably attachable to a respective one of the brackets 46 and each of the mounts 56 has a receiving element 58. Each of the mounts 56 comprises a channel 60 that has an upper panel 62 extending between a pair of sidelong panels 64. Each of the sidelong panels 64 is perpendicularly oriented with the upper panel 62 and each of the sidelong panels 64 has a pair of fastener holes 66 extending through a respective one of the sidelong panels 64. The upper panel 62 rests on the pair of outward panels 50 of a respective one of the brackets 46 and each of the sidelong panels 64 extends downwardly along a respective one of the outward panels 50 of the respective bracket 46. The channel 60 is positioned such that each of the fastener holes 66 in each of the sidelong panels 64 is aligned with a respective one of the holes 52 in the respective outward panel 50 of the respective bracket 46. A plurality of mount pins 67 is provided and each of the mount pins 67 is extendable through a respective one of the fastener holes 66 and a respective one of the holes 52 in a receptive outward panel 50 for attaching the mounts 56 to the brackets 46.

Each of the mounts 56 includes a mount tube 68 is provided which has a lower end 70 that is coupled to the upper panel 62 of the channel 60 such that the mount tube 68 extends upwardly from the upper panel 62. The mount tube 68 has an upper end 72 that is open such that the upper end 72 of the mount tube 68 associated with a respective one of the mounts 56 defines the receiving element 58 of the respective mount 56. The mount tube 68 has a lateral wall 74 extending between the upper end 72 and the lower end 70. Furthermore the mount tube 68 has a plurality of holes 76 extending through the lateral wall 74 and each of the plurality of holes 76 in the mount tube 68 is spaced apart from each other and is distributed between the upper end 72 and the lower end 70.

A pair of support tubes 78 is provided and each of the support tubes 78 is insertable into the receiving element 58 in a respective one of the mounts 56. Each of the support tubes 78 has a plurality of holes 80 extending through an outside wall 81 of the support tubes 78. Additionally, each of the support tubes 78 is insertable into the upper end 72 of the mount tube 68 of a respective one of the mounts 56. A pair of pin sleeves 82 is each positioned within a respective one of the support tubes 78 and each of the pin sleeves 82 extends through opposing sides of the outside wall 82 of the respective support tube 78. Additionally, each pin sleeve 82 is positioned proximate a top end 84 of the respective support tube 78.

A plurality of mount pins 86 is provided and each of the plurality of mount pins 86 is extendable through a respective one of the holes 76 in the mount tube 68 associated with a respective one of the mounts 56. Each of the mount pins 86 extends through a respective one of the holes 80 in the outside wall 82 of a respective one of the support tubes 78 for retaining the support tubes 78 at a selected height in the mount tube 68 associated with the respective mount 56. A pair of box pivots 88 is provided and each of the box pivots 88 is movably attachable to a respective one of the support tubes 78 such that each of the box pivots 88 freely pivots in the respective support tube 78. Each of the box pivots 88 comprises a panel 90 that has a front surface 92, a back surface 94 and a top edge 96. The panel 90 has a lobe 98 extending upwardly from the top edge 96 and the lobe 98 is centrally positioned on the top edge 96.

Each of the box pivots 88 includes a pivot pin 100 that is coupled to and extends away from the back surface 94 of the panel 90. The pivot pin 100 associated with each of the box pivots 88 is insertable through a respective one of the pin sleeves 82 in a respective one of the support tubes 78 such that the panel 90 associated with each of the box pivots 88 is directed toward each other. A cotter pin 102 is extendable through a cotter hole 104 in the pivot pin 100 when the pivot pin 100 is inserted through the respective pin sleeve 82 thereby inhibiting the pivot pin 100 from being removed from the respective pin sleeve 82.

A box 106 is included which has a pair of engaging elements 108 that is each integrated into the box 106. Each of the box pivots 88 is attachable to a respective one of the engaging elements 108 in the box 106 such that the box 106 is pivotally retained between the pair of support tubes 78. In this way the box 106 is retained in an upright position whether the tailgate 14 on the truck bed 16 is positioned in a closed position or an open position. Thus, the box 106 is accessible to a user 112 when the user 112 opens the tailgate 14 without requiring the user 112 to reach into the truck bed 16 to retrieve the box 106.

The box 106 has a first lateral wall 114 and a second lateral wall 116 and the box 106 has a pair of wells 118 each is recessed into a respective one of the first lateral wall 114 and the second lateral wall 116. Furthermore, each of the wells 118 defines a respective one of the engaging elements 108 in the box 106. Each of the wells 118 has a bounding edge 120 which conforms to a shape of the panel 90 associated with the box pivots 88 thereby facilitating the panel 90 associated with the box pivots 88 to be inserted into a respective one of the wells 118. The lobe 98 on the top edge 96 of the panel 90 associated with each of the box pivots 88 engages a top side 122 of the bounding edge 120 of the respective well 118 for removably retaining the panel 90 associated with each of the box pivots 88 in the respective well 118. The box 106 includes a lid 124 that is hingedly disposed on the box 106 for opening and closing the box 106. Furthermore, the box 106 may be comprised of a thermally insulating material to facilitate the box 106 to store cold items, such as ice, beverages and food items, in the convention of a cooler.

In use, the cross members 12 and brackets 46 are attached to the tailgate 14 in the aforementioned steps. Each of the box pivots 88 is attached to the respective support tube 78 and each of the box pivots 88 is engaging element in the box 106. Continuing, each of the mounts 56 is secured to the respective bracket 46 thereby pivotally mounting the box 106 to the tailgate 14. As is most clearly shown in FIG. 6, the box pivots 88 such that the box 106 is oriented in an upright position in the truck bed 16 when the tailgate 14 is closed. As is most clearly shown in FIG. 5, the box 106 pivots on the support tubes 78 while the tailgate 14 is being opened. As is most clearly shown in FIG. 4, the box 106 pivots into an upright position once the tailgate 14 is opened. In this way the box 106 is accessible with the tailgate 14 is opened and the box 106 is stored in the truck bed 16 when the tail gate is closed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cargo support assembly for pivotally retaining cargo on a tailgate of a truck bed, said assembly comprising:
    a pair of cross members, each of said cross members having a telescopically adjustable length thereby facilitating each of said cross members to extend laterally across a tailgate of a truck bed;
    a pair of brackets, each of said brackets being attached to said pair of cross members such that each of said brackets is perpendicularly oriented with said pair of cross members;
    a pair of mounts, each of said mounts being removably attachable to a respective one of said brackets, each of said mounts having a receiving element;
    a pair of support tubes, each of said support tubes being insertable into said receiving element in a respective one of said mounts;
    a pair of box pivots, each of said box pivots being movably attachable to a respective one of said support tubes such that each of said box pivots freely pivots in said respective support tube; and
    a box having a pair of engaging elements each being integrated into said box, each of said box pivots being attachable to a respective one of said engaging elements in said box such that said box is pivotally retained between said pair of support tubes thereby facilitating said box to be retained in an upright position whether the tailgate on the truck bed is positioned in a closed position or an open position wherein said box is configured to be accessible to a user when the user opens the tailgate.

2. The assembly according to claim 1, wherein:
    each of said cross members has a first end, a second end and a slot extending substantially between said first end and said second end, each of said cross members having a first foot being perpendicularly oriented with said first end, each of said cross members having a second foot being perpendicularly oriented with said second end;
    each of said cross members comprises a first half slidably engaging a second half thereby facilitating said cross members to have said telescopically adjustable length, said first end being associated with said first half, said second end being associated with said second half;
    said first foot associated with each of said cross members having a first aperture extending through said first foot;
    said second foot associated with each of said cross members has a second aperture extending through said second foot;
    each of said cross members lies on a top surface of the tailgate having each of said first foot and said second foot being abutted against a respective one of a first lateral edge and a second lateral edge of the tailgate thereby facilitating a plurality of fasteners to be extended through a respective one of said first aperture and said second aperture associated with a respective one of said cross members and engaging a respective one of the first lateral edge and the second lateral edge of the tailgate for attaching said cross members to the tailgate; and
    each of said cross members includes a lock extending though said slot in said first half and said slot in said second half.

3. The assembly according to claim 2, further comprising a pair of locks, each of said locks being movably integrated into a respective one of said cross members, each of said locks extending through said slot in said first half and said slot in said second half of said respective cross member, each of said locks being tightenable to compress said first half of said respective cross member against said second half of said respective cross member for retaining said respective cross member at a desired length.

4. The assembly according to claim 2, wherein each of said brackets comprises a lower panel extending between a pair of outward panels, each of said outward panels being perpendicularly oriented with said lower panel, said lower panel of each of said brackets resting on said pair of cross members having said outward panels of each of said brackets extending away form said cross members, each of said outward panels of each of said cross members having a plurality of holes being spaced apart from each other and being distributed along a respective one of said outward panels.

5. The assembly according to claim 4, further comprising a plurality of bracket fasteners, each of said bracket fasteners extending through said lower panel of a respective one of said brackets and extending through said slot in a respective one of said first half and said second half of a respective one of said cross members for fastening said brackets to said cross members.

6. The assembly according to claim 4, wherein:
each of said mounts comprises a channel having an upper panel extending between a pair of sidelong panels, each of said sidelong panels being perpendicularly oriented with said upper panel;
each of said sidelong panels has a pair of fastener holes extending through a respective one of said sidelong panels;
said upper panel rests on said pair of outward panels of a respective one of said brackets having each of said sidelong panels extending downwardly along a respective one of said outward panels of said respective bracket; and
said channel is positioned such that each of said fastener holes in each of said sidelong panels is aligned with a respective one of said holes in said respective outward panel of said respective bracket.

7. The assembly according to claim 6, wherein:
each of said mounts includes a mount tube being having a lower end being coupled to said upper panel of said channel such that said mount tube extends upwardly from said upper panel;
said mount tube has an upper end being open such that said upper end of said mount tube associated a respective one of said mounts defines said receiving element of said respective mount;
said mount tube has a lateral wall extending between said upper end and said lower end; and
said mount tube has a plurality of holes each extending through said lateral wall being spaced apart from each other and being distributed between said upper end and said lower end.

8. The assembly according to claim 7, wherein each of said support tubes has a plurality of holes extending through an outside wall of said support tubes, each of said support tubes being insertable into said upper end of said mount tube of a respective one of said mounts.

9. The assembly according to claim 8, further comprising a pair of pin sleeves, each of said pin sleeves being positioned within a respective one of said support tubes, each of said pin sleeves extending through opposing sides of said outside wall of said respective support tube, each of said pin sleeves being positioned proximate a top end of said respective support tube.

10. The assembly according to claim 8, further comprising a plurality of mount pins, each of said mount pins being extendable through a respective one of said holes in said mount tube associated with a respective one of said mounts, each of said mount pins extending through a respective one of said holes in said outside wall of a respective one of said support tubes for retaining said support tubes at a selected height in said mount tube associated with said respective mount.

11. The assembly according to claim 9, wherein each of said box pivots comprises:
a panel having a front surface, a back surface and a top edge, said panel having a lobe extending upwardly from said top edge, said lobe being centrally positioned on said top edge;
a pivot pin being coupled to and extending away from said back surface of said panel, said pivot pin associated with each of said box pivots being insertable through a respective one of said pin sleeves in a respective one of said support tubes such that said panel associated with each of said box pivots is directed toward each other; and
a cotter pin being extendable through a cotter hole in said pivot pin when said pivot pin is inserted through said respective pin sleeve thereby inhibiting said pivot pin from being removed from said respective pin sleeve.

12. The assembly according to claim 11, wherein said box has a first lateral wall and a second lateral wall, said box having a pair of wells each being recessed into a respective one of said first lateral wall and said second lateral wall such that each of said wells defines a respective one of said engaging elements, each of said wells having a bounding edge which conforms to a shape of said panel associated with said box pivots thereby facilitating said panel associated with said box pivots to be inserted into a respective one of said wells, said lobe on said top edge of said panel associated with each of said box pivots engaging a top side of said bounding edge of said respective well for removably retaining said panel associated with each of said box pivots in said respective well.

13. A cargo support assembly for pivotally retaining cargo on a tailgate of a truck bed, said assembly comprising:
a pair of cross members, each of said cross members having a telescopically adjustable length thereby facilitating each of said cross members to extend laterally across a tailgate of a truck bed, each of said cross members having a first end, a second end and a slot extending substantially between said first end and said second end, each of said cross members having a first foot being perpendicularly oriented with said first end, each of said cross members having a second foot being perpendicularly oriented with said second end, each of said cross members comprising a first half slidably engaging a second half thereby facilitating said cross members to have said telescopically adjustable length, said first end being associated with said first half, said second end being associated with said second half, said first foot associated with each of said cross members having a first aperture extending through said first foot, said second foot associated with each of said cross members having a second aperture extending through said second foot, each of said cross members lying on a top surface of the tailgate having each of said first foot and said second foot being abutted against a respective one of a first lateral edge and a second lateral edge of the tailgate thereby facilitating a plurality of fasteners to be extended through a respective one of said first aperture and said second aperture associated with a respective one of said cross members and engaging a respective one of the first lateral edge and the second lateral edge of the tailgate for attaching said cross members to the tailgate;
a pair of locks, each of said locks being movably integrated into a respective one of said cross members, each of said locks extending through said slot in said first half and said slot in said second half of said respective cross member, each of said locks being tightenable to compress said first half of said respective cross member against said second half of said respective cross member for retaining said respective cross member at a desired length;
a pair of brackets, each of said brackets being attached to said pair of cross members such that each of said brackets is perpendicularly oriented with said pair of cross members, each of said brackets comprising a lower panel extending between a pair of outward panels, each of said outward panels being perpendicularly oriented with said lower panel, said lower panel of each of said brackets resting on said pair of cross members having said outward panels of each of said brackets extending away form said cross members, each of said outward panels of each of said cross members having a plurality of holes being spaced apart from each other and being distributed along a respective one of said outward panels;

a plurality of bracket fasteners, each of said bracket fasteners extending through said lower panel of a respective one of said brackets and extending through said slot in a respective one of said first half and said second half of a respective one of said cross members for fastening said brackets to said cross members;

a pair of mounts, each of said mounts being removably attachable to a respective one of said brackets, each of said mounts having a receiving element, each of said mounts comprising:

a channel having an upper panel extending between a pair of sidelong panels, each of said sidelong panels being perpendicularly oriented with said upper panel, each of said sidelong panels having a pair of fastener holes extending through a respective one of said sidelong panels, said upper panel resting on said pair of outward panels of a respective one of said brackets having each of said sidelong panels extending downwardly along a respective one of said outward panels of said respective bracket, said channel being positioned such that each of said fastener holes in each of said sidelong panels is aligned with a respective one of said holes in said respective outward panel of said respective bracket; and a mount tube being having a lower end being coupled to said upper panel of said channel such that said mount tube extends upwardly from said upper panel, said mount tube having an upper end being open such that said upper end of said mount tube associated a respective one of said mounts defines said receiving element of said respective mount, said mount tube having a lateral wall extending between said upper end and said lower end, said mount tube having a plurality of holes each extending through said lateral wall being spaced apart from each other and being distributed between said upper end and said lower end;

a pair of support tubes, each of said support tubes being insertable into said receiving element in a respective one of said mounts, each of said support tubes having a plurality of holes extending through an outside wall of said support tubes, each of said support tubes being insertable into said upper end of said mount tube of a respective one of said mounts;

a pair of pin sleeves, each of said pin sleeves being positioned within a respective one of said support tubes, each of said pin sleeves extending through opposing sides of said outside wall of said respective support tube, each of said pin sleeves being positioned proximate a top end of said respective support tube;

a plurality of mount pins, each of said mount pins being extendable through a respective one of said holes in said mount tube associated with a respective one of said mounts, each of said mount pins extending through a respective one of said holes in said outside wall of a respective one of said support tubes for retaining said support tubes at a selected height in said mount tube associated with said respective mount;

a pair of box pivots, each of said box pivots being movably attachable to a respective one of said support tubes such that each of said box pivots freely pivots in said respective support tube, each of said box pivots comprising:

a panel having a front surface, a back surface and a top edge, said panel having a lobe extending upwardly from said top edge, said lobe being centrally positioned on said top edge;

a pivot pin being coupled to and extending away from said back surface of said panel, said pivot pin associated with each of said box pivots being insertable through a respective one of said pin sleeves in a respective one of said support tubes such that said panel associated with each of said box pivots is directed toward each other; and a cotter pin being extendable through a cotter hole in said pivot pin when said pivot pin is inserted through said respective pin sleeve thereby inhibiting said pivot pin from being removed from said respective pin sleeve; and a box having a pair of engaging elements each being integrated into said box, each of said box pivots being attachable to a respective one of said engaging elements in said box such that said box is pivotally retained between said pair of support tubes thereby facilitating said box to be retained in an upright position whether the tailgate on the truck bed is positioned in a closed position or an open position wherein said box is configured to be accessible to a user when the user opens the tailgate, said box having a first lateral wall and a second lateral wall, said box having a pair of wells each being recessed into a respective one of said first lateral wall and said second lateral wall such that each of said wells defines a respective one of said engaging elements, each of said wells having a bounding edge which conforms to a shape of said panel associated with said box pivots thereby facilitating said panel associated with said box pivots to be inserted into a respective one of said wells, said lobe on said top edge of said panel associated with each of said box pivots engaging a top side of said bounding edge of said respective well for removably retaining said panel associated with each of said box pivots in said respective well.

* * * * *